United States Patent
Winberg et al.

(10) Patent No.: US 7,243,218 B2
(45) Date of Patent: Jul. 10, 2007

(54) METHOD AND PROCESSING UNIT FOR SELECTIVE VALUE PREDICTION USING DATA CACHE HIT/MISS INFORMATION AND/OR DEPENDENCY DEPTH INFORMATION

(75) Inventors: Lars Winberg, Stockholm (SE); Per Holmberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 311 days.

(21) Appl. No.: 10/484,195

(22) PCT Filed: Feb. 21, 2002

(86) PCT No.: PCT/SE02/00298

§ 371 (c)(1),
(2), (4) Date: Jan. 20, 2004

(87) PCT Pub. No.: WO03/009134

PCT Pub. Date: Jan. 30, 2003

(65) Prior Publication Data

US 2004/0199752 A1    Oct. 7, 2004

(30) Foreign Application Priority Data

Jul. 19, 2001 (SE) .................................... 0102564

(51) Int. Cl.
*G06F 7/38* (2006.01)
*G06F 9/00* (2006.01)
*G06F 9/44* (2006.01)
*G06F 15/00* (2006.01)

(52) U.S. Cl. ...................................... 712/239; 712/225

(58) Field of Classification Search ................ 712/225, 712/239
See application file for complete search history.

(56) References Cited

U.S. PATENT DOCUMENTS 5,781,752 A    7/1998    Moshovos et al.

(Continued)

FOREIGN PATENT DOCUMENTS

WO    WO 93/18459    6/1995

(Continued)

OTHER PUBLICATIONS

Brad Calder, Genn Reinman and Dean M. Tullsen; "Selective Value Prediction"; 1999.*

(Continued)

*Primary Examiner*—Donald Sparks
*Assistant Examiner*—Jesse Moll
(74) *Attorney, Agent, or Firm*—Nixon & Vanderhye, P.CC

(57) ABSTRACT

The present invention relates to a processing unit for executing instructions in a computer system and to a method in such a processing unit. According to the present invention a decision is made whether or not to base execution on a value prediction (P), wherein the decision is based on information associated with the estimated time gain of execution based on a correct prediction. According to an embodiment of the present invention the decision regarding whether or not to execute speculatively is based on information regarding whether a cache hit or a cache miss is detected in connection with a load instruction. In an alternative embodiment of the present invention the decision is based on information regarding the dependency depth of the load instruction, i.e. the number of instructions that are dependent on the load.

24 Claims, 5 Drawing Sheets

U.S. PATENT DOCUMENTS 5,933,860 A     8/1999    Emer et al.
5,996,060 A    11/1999    Mendelson et al.
6,487,639 B1 * 11/2002    Lipasti ...................... 711/137

FOREIGN PATENT DOCUMENTS

WO    WO 98/21684    5/1998
WO    WO 00/34882    6/2000

OTHER PUBLICATIONS

Diefendorff, "PC Processor Microarchitecture.", Microdesign Resources, Jul. 12, 1999, pp. 16-22.

Lipasti et al., "Value Locality and Load Value Prediction", ASPLOS VII, Oct. 1996, pp. 136-147.

Tune et al., Dynamic Prediction of Critical Path Instructions, in the Proceedings of the 7$^{th}$ International Symposium on High Performance Computer Architecture, Jan. 2001, pp. 1-11.

Reinman et al., Predictive Techniques for Aggressive Load Speculation, Published in the Proceedings of The Annual 31$^{st}$ International Symposium on Microarchitecture, Dec. 1998 pp. 1-11.

Calder et al., "Selective Value Prediction", Published in the Proceedings of the 26$^{th}$ International Symposium on Computer Architecture, May 1999, pp. 111.

ABSTRACT, JP-7105092, Naoyuki et al., filed Sep. 30, 1993.

* cited by examiner

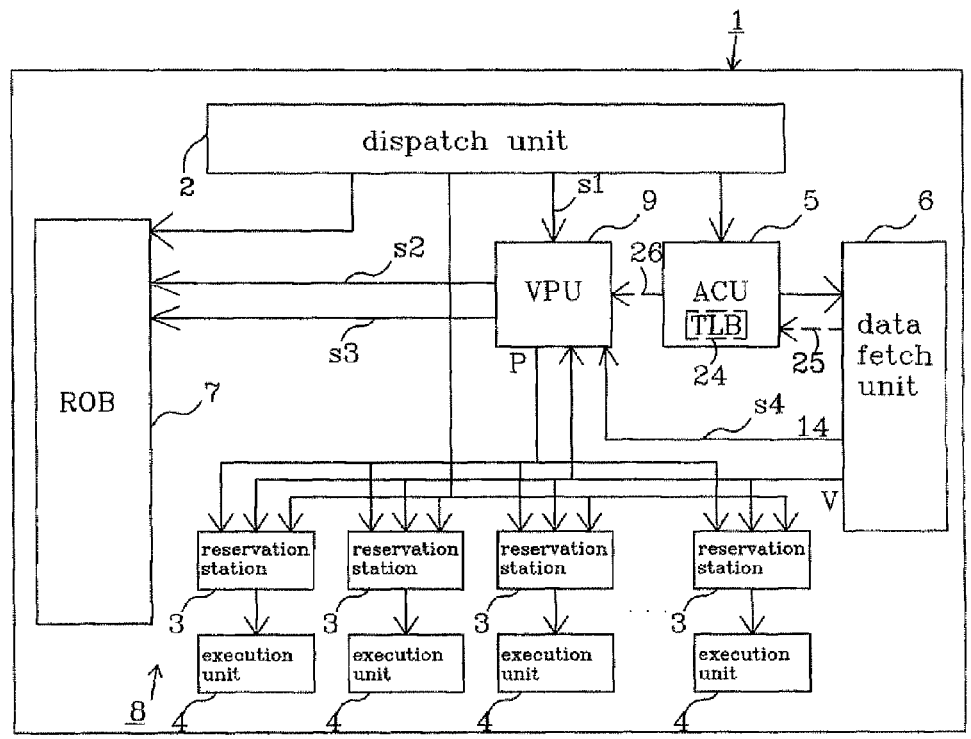
Fig. 1 (Prior Art)
Fig. 2a (Prior Art)
Fig. 2b (Prior Art)
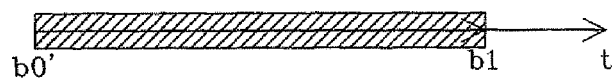
Fig. 2c (Prior Art)
Fig. 2d (Prior Art)
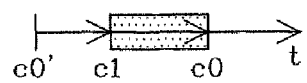

16
↘
```
load  reg1, address1
add   reg2, reg1, reg3
load  reg4, adress3
mul   reg5, reg4, reg9
```
17
⤳ `sub   reg11, reg5, reg2`

| SID0 | SID1 |     |
|------|------|-----|
| 1    |      | SN0 |
| 1    |      | SN1 |
|      | 1    | SN2 |
|      | 1    | SN3 |
| 1    | 1    | SN4 |

Fig. 6e

METHOD AND PROCESSING UNIT FOR SELECTIVE VALUE PREDICTION USING DATA CACHE HIT/MISS INFORMATION AND/OR DEPENDENCY DEPTH INFORMATION

This application is the U.S. national phase of international application PCT/SE02/00298 filed Feb. 21, 2002 which designated the U.S., and claims the priority of Swedish patent application No. 0102564-2 filed Jul. 19, 2001, the entire contents of both of which are hereby incorporated by reference.

FIELD OF THE INVENTION

The present invention relates in general to computer systems, and more specifically to the design and functioning of a processor.

RELATED ART AND OTHER CONSIDERATIONS

The performance of computer processors has been tremendously enhanced over the years. This has been achieved both by means of making operations faster and by means of increasing the parallelism of the processors, i.e. the ability to execute several operations in parallel. Operations can for instance be made faster by means of improving transistors to make them switch faster or optimizing the design to minimize the level of logic needed to implement a given function. Techniques for parallelism include pipelining and superscalar techniques. Pipelined processors overlap instructions in time on common execution resources. Superscalar processors overlap instructions in space on separate execution resources. Many processor architectures are combinations of a pipelined and a superscalar processor.

Today, one of the major limiting factors in processor performance is memory speed. In order to fully benefit from the processor's speed, the processor must receive data to operate on from data memory at a speed that keeps the processor busy continuously. This problem can be attacked by supplying a smaller and faster memory, called a cache, close to the processor. The cache reduces the delay associated with memory access by storing subsets of the memory data that can be quickly read and modified by the processor. There are many different methods that can be used to map data from the memory to the cache. If the temporal and spatial locality is beneficial the cache may help to circumvent the underlying problem of divergence in processor speed and memory speed.

Lately, it has been suggested to not just store data closer to the processor in a cache but also attempt to predict the value of requested data. This enables the processor to continue executing speculatively using the predicted value while waiting for the true value to be delivered from the memory system. When the true value arrives the validity of the prediction is checked. If the prediction was correct the speculative execution is correct and a performance gain is realized. If the prediction was incorrect the speculative execution is incorrect and must be re-executed with the correct value. A flush of mis-speculated execution and a restart of the executed instructions that depend on the predicted value imply a time loss. Since incorrect prediction is costly, prediction confidence threshold values based on the history of earlier predictions are often used to inhibit value prediction if the likelihood of correct prediction is too small.

U.S. Pat. No. 5,781,752 discloses a processor provided with means for speculative execution. The processor has a data speculation circuit comprising a prediction threshold detector and a prediction table. The prediction table stores prediction counters that reflect the historical rate of misspeculation for an instruction. The prediction threshold detector prevents data speculation for instructions having a prediction counter within a predetermined range.

"Predictive Techniques for Aggressive Load Speculation", Reinman Glenn et al., published in the Proceedings of the Annual 31$^{st}$ International Symposium on Microarchitecture, December 1998 describes a number of methods for load speculation, one of them being value prediction. It is further described that the method of value prediction uses a confidence counter to decide when to speculate a load. The counter is increased if a correct prediction occurs and decreased if the prediction is incorrect. Speculative execution will only take place if the counter is above a predict threshold.

Lipasti M. H. et al., "Value Locality and Load Value Prediction", Proceedings of the ACM Conference on Architectural Support for Programming Languages and Operating Systems, 1996 describes the concept of value locality which is defined as the likelihood of a previously-seen value recurring repeatedly within a storage location. It is discussed that it might be beneficial to introduce a load value prediction unit if the value locality is significant. The load value prediction unit comprises a load classification table for deciding which predictions are likely to be correct. The load classification table includes counters for load instructions. The counters indicate the success rate of previous predictions and are incremented for correct predictions and decremented otherwise. Based on the value of the counter a load instruction is classified as unpredictable, predictable or constant. Speculative execution is prevented for load instructions that are classified as unpredictable.

Calder B. et al., "Selective Value Prediction", Proceedings of the 26$^{th}$ International Symposium on Computer Architecture, May 1999 describes techniques for selectively performing value prediction. One such technique is instruction filtering, which filters which instructions put values into the value prediction table. Filtering techniques that discussed include filtering based on instruction type and giving priority to instructions belonging to the data dependence path in the processor's active instruction window.

Tune E. et al., "Dynamic Prediction of Critical Path Instructions", Proceedings of the 7$^{th}$ International Symposium on Hogh Performance Computer Architecture, January 2001, and Fields B. et al., "Focusing Processor Policies via Critical-Path Prediction", International Symposium on Computer Architecture, June 2001 describe value prediction wherein a critical path prediction is used to choose the instructions to predict.

BRIEF SUMMARY

The methods for deciding whether or not to execute speculatively based on a predicted value, which were described above, have disadvantages. Some of the methods described above are based merely on an estimation of the likelihood of correct prediction based on historical statistics. This may result in taking unnecessarily high risks. Executing speculatively is a gamble, if the prediction is correct, you win time, but if the prediction is incorrect you loose time. Thus, execution based on a predicted value implies exposure to the risk of delaying execution considerably due to a flush and restart. Since the cost of an incorrect prediction is high it is desirable to only expose the processor to the risk involved in speculative execution when it can be motivated.

Some of the methods for selective value speculation described above base the decision of whether or not to use a predicted value on instruction dependency predictions, which means that a prediction of what the possible gain may be is weighed into the decision. These methods make it possible to avoid speculative execution in some cases where it is unwise due to the possible gain being very low. However, all of the described methods of this type are rather complex and they all use predictions relating to dependency instead of true dependency information, which means that there is a degree of uncertainty involved.

The processing unit and method include relatively simple means for deciding when to execute speculatively and wherein the decision to execute speculatively is based on criteria that allows for improved management of the risks involved, as compared with the prior art wherein the decision is based merely on an estimation of the likelihood of correct prediction.

Improved risk management is afforded by means of basing the decision whether or not to execute speculatively on information associated with the estimated time gain of execution based on a correct prediction. It is with the prior art methods possible that the processing unit is exposed to the negative impact of mis-prediction also when the gain for a correct prediction is very small. It is possible to make wiser decisions by means of taking the gain for a correct prediction into account. If the cost for mis-prediction is high and the gain for correct prediction is low it is probably wise not to speculate even if the likelihood of a correct prediction is high. Since the estimated gain of correct prediction is a decision criterion it is possible to avoid speculative execution in situations where it might seem unwise to speculate but where speculative execution undoubtedly would take place if the decision was based merely on the likelihood of a correct prediction, as in the prior art methods described above.

According to an example embodiment, the decision regarding whether or not to execute speculatively is based on information regarding whether a cache hit or a cache miss is detected in connection with a load instruction. A cache hit implies that the true value corresponding to the instruction will be available shortly since the value was found in a very fast memory. If, on the other hand, a cache miss is detected it is a sign that the value must be loaded from a slower memory and that it might take a while until the true value is available. Therefore, a cache hit is a factor that weighs against speculative execution, since it implies a small performance gain for a correct prediction.

In an alternative embodiment a cache hit prediction, based on the historic likelihood of detecting a cache hit or miss for a value of a certain load instruction, is used as a factor in the speculation decision, instead of the actual detected cache hit or miss.

According to yet another alternative embodiment the decision regarding whether or not to execute speculatively is based on information regarding the true dependency depth of the load instruction, i.e. the number of instructions that are dependent on the load. If the number of dependent instructions is low it might, depending on the processor architecture, be possible to hide the latency of the load with other instructions that are independent of the load. If this is possible the gain of a correct prediction for the load will be small or none at all. The dependency depth of a certain load instruction is therefore, according to an embodiment, used as a factor in the decision regarding whether to execute the load instruction speculatively or not. According to other embodiments a predicted dependency depth is used as a factor in the decision instead of the true dependency depth.

An advantage of the present technology is that it makes it possible to improve the performance of processing units since the technology makes it possible to avoid speculative execution when the gain for a correct value prediction is too small to motivate taking the risk of mis-prediction. The cost of recovery due to mis-prediction is fairly large and it would therefore be unwise to expose the processor to the risk of a recovery when the performance gain involved in the value speculation is small. The present technology makes it possible to restrict value speculation to when the potential gain is significant.

A further advantage is that since it makes it possible to avoid speculative execution when the performance gain is small, the cost of recovery becomes less critical. It is possible to allow more costly recovery since restricting speculative execution is limited to cases where the estimated performance gain of correct prediction is considerably larger than the recovery cost.

Another advantage of an embodiment is that it reduces the need for storage of value prediction history statistics as will be explained in greater detail below.

Yet another advantage of the embodiment is that it the information relating to the possible time gain of a correct decision which is used in the decision of whether or not to execute speculatively, is information that relates to the next execution of the instruction for which speculative execution is an option and not to historic information relating to earlier executions of the same instruction. Thus the confidence in making a correct decision regarding speculative execution is improved according to this embodiment.

The invention will now be described with the aid of preferred embodiments and with reference to a accompanying drawings.

BRIEF DESCRIPTION OF THE DRAWINGS

FIG. 1 is a schematic block diagram of selected parts of a processor that is adapted according to an example embodiment.

FIGS. 2a–d are time diagrams that illustrate the possible gain and loss involved for speculative execution in cases where a cache hit occurs and in cases where a cache miss occurs.

FIGS. 6a–6e are schematic block diagrams that illustrate an example of how dependency depth is registered and utilized according to an embodiment of the present invention.

DETAILED DESCRIPTION OF SPECIFIC EMBODIMENTS

Figure 3:
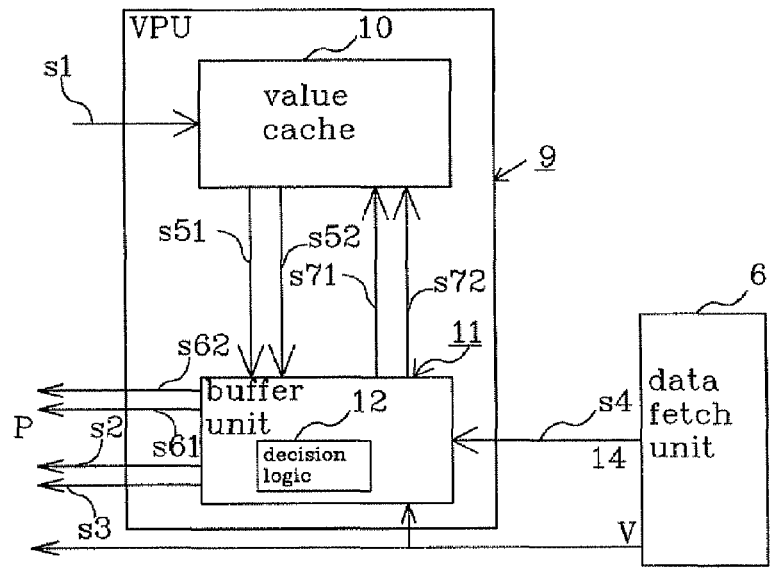
FIG. 3 is a block diagram of a value prediction unit according to an example embodiment, where arrows indicate the steps involved in an embodiment of an example method.

FIG. 1 shows a schematic block diagram of selected parts of a processor 1. A dispatch unit 2 is shown, which determines the instructions that are to be executed next and distributes the instructions between a number of reservation stations 3 for forwarding to execution units 4. In order to execute the instructions, data may have to be fetched from memory and supplied to the execution units 4. Fetching of data from memory is handled by address calculation unit (ACU) 5 and data fetch unit 6, which output the fetched data to the reservation stations 3. The data fetch unit is able to load data from memory units such as a cache or other types of slower memory units (not shown). The processor 1 is an out-of-order processor, i.e. a processor that allows instructions to be executed out of program order. Out-of-order execution is supported by a Reorder buffer (ROB) 7, which buffers results until they can be written to a register file in program order. The reservation stations 3, the execution units 4 and the ROB 7 constitute the execution engine 8 of the processor 1.

The processor 1 further comprises a value prediction unit (VPU) 9, which enables predictions of values to be fetched from memory. The predictions can be used for speculative execution. If speculative execution is to be performed the value prediction unit 9 produces a prediction P that is presented to the appropriate reservation station 3 before the true value V is received from the data fetch unit 6. The execution is carried out based on the prediction P. Flags are set to indicate that results based on the prediction P are speculative. When the true value V is received from memory the data fetch unit 6 sends this value to the VPU 9, which uses this value to check if the prediction P was correct. If the prediction P was correct (i.e. P=V) the VPU 9 sends a signal s2 to the execution engine 8 that the prediction P was correct and that speculative flags can be cleared. If the prediction P was incorrect (i.e. P≠V), the VPU 9 sends a flush order s3 to the execution engine 8, which causes all results based on the incorrect prediction to be flushed out from the ROB 7 and restarts execution based on the true value V.

When a load instruction (i.e. an instruction to fetch data from memory) is to be executed the VPU 9 receives an index signal s1 from the dispatch unit 2, which is used to index (via some hash function) the prediction P. As described above a decision of whether or not to use the prediction P for speculative execution is often made based on the historical success rate of earlier predictions for the same value. The VPU 9 may for this purpose store a counter, or some other type of history data, which is associated with a particular value and which reflects the success rate of earlier predictions for the particular value. The index signal s1 from the dispatch unit 2 is used to retrieve the appropriate counter or history data. As mentioned above there are several known methods for keeping track of past success rate of predictions and basing the decision whether to speculate or not on this success rate.

As mentioned above, it is possible that speculation takes place in situations where it might be preferable to wait for the true value V, if the past success rate is used as the only speculation decision criteria. If the estimated gain of speculative execution based on a prediction, that later turn out to be correct, is small it might be better not to speculate and instead wait for the true value V. The estimated gain of execution based on a correct prediction for a load instruction is used as a speculation decision criterium. Thereby, the risk of unwisely exposing the processor to the negative impact of mis-prediction can be reduced.

A cache hit or a cache miss gives an indication of what the gain from speculative execution might be for a particular load instruction. In an embodiment a cache hit or miss is therefore taken into consideration when the decision whether to speculate or not is made. It is possible to decide to only speculate when the load latency is large and the performance gain for correct prediction is high. A cache miss is an indication of large load latency since it indicates that the value was not found in the cache but has to be loaded from a slower memory. A cache hit on the other hand indicates that the true value will be available in this or the next few cycles since loads from the cache can be performed quickly. It is thus more advantageous to speculate when a cache miss is detected than when a cache hit is detected. FIGS. 2a–d give an illustration of the possible gain and loss involved for speculative execution in cases where a cache hit occurs and in cases where a cache miss occurs.

FIG. 2a illustrates a time line t for a case where a cache miss occurs and the prediction was incorrect. The speculative execution starts at time a0'. At time a1 the true value is received which shows that the prediction was incorrect and causes a restart. The restart is finished at time a0 where non-speculative execution begins based on the true value.

FIG. 2b illustrates a time line t for a case where a cache miss occurs and the prediction was correct The speculative execution starts at time b0'. At time b1 the true value is received which shows that the prediction was correct. Execution can continue from time b1 without having to restart and re-execute what was executed between time b0' and time b1.

FIG. 2c illustrates a time line t for a case where a cache hit occurs and the prediction was incorrect. The speculative execution starts at time c0'. At time c1 the true value is received which shows that the prediction was incorrect and causes a restart. The restart is finished at time c0 where non-speculative execution begins based on the true value.

FIG. 2d illustrates a time line t for a case where a cache hit occurs and the prediction was correct. The speculative execution starts at time d0'. At time d1 the true value is received which shows that the prediction was correct. Execution can continue from time d1 without having to restart and re-execute what was executed between time d0' and time d1.

The dotted areas in FIGS. 2a and 2c indicate the execution time loss due to restart. The dashed areas indicate the execution time gain due to correct value speculation. Thus a cache miss indicates a possible gain that is large compared to the possible loss, while a cache hit indicates a possible gain that is small compared to the possible loss.

The processor is exposed to the danger of imposing the restart penalty (a1-a0 or c1-c0) only when the potential performance gain is large as it is at a cache miss.

Hence according to an embodiment a cache hit signal s4 is input to the VPU 9 as shown in FIG. 1. The cache hit signal s4 includes cache hit/miss information 14 tat indicate whether a cache hit or a cache miss was detected. According to an embodiment a detected cache hit is used as a speculation inhibit signal, such that the VPU 9 is prevented from presenting speculative data to the reservation stations 3 when the cache hit signal s4 indicates a cache hit. In another embodiment the cache hit/miss information 14 and history data related to the success rate of previous predictions are weighted and combined to form a decision value tat indicates whether or not speculative execution should take place. The cache hit/miss information 14 is an added criterion, which is used as a factor in the speculation decision scheme. Many alternative decision schemes tat take cache hit/miss information into consideration are possible as will be explained in greater detail below.

FIG. 3 shows an implementation of the VPU 9. The VPU 9 comprises a value cache 10 and a buffer unit 11. In the value cache 10, values and information related to the values are stored. The values that are stored in the value cache 10 are not the true values V but predictions P of the true values V. Each prediction P corresponds to a particular load instruction. The predictions are associated with an identity code, which is used to identify the prediction that corresponds to a particular load instruction. History data, such as counter data, related to earlier predictions is also stored in the value cache 10.

When a load instruction is to be executed the dispatch unit 2 sends the index signal s1 to the value cache 10. The index signal s1 contains an index, which for instance is a hashing of the load instruction's address or a hashing of the data address, and which helps the value cache 10 to identify the prediction P associated with the load instruction to be executed. The value cache 10 delivers the prediction P and the history data associated with the prediction to the buffer unit 11 (signals s51 and s52). The buffer unit 11 has decision logic 12 that based on predetermined rules for value prediction decides whether or not to speculate. According to an embodiment the decision logic 12 receives both history data and the cache hit signal s4 as input. If the decision logic 12 decides to speculate the prediction P is delivered (signal s61) to the execution engine 8 of the processor together with a flag (signal s62) indicating the speculative nature of the value.

After some period of time the true value V is delivered from the memory system and received in the buffer unit 11. The true value is compared with the prediction P kept in the buffer unit If the prediction P was correct the clear speculative flag order s2 is sent to the execution engine 8. If the prediction P was incorrect the flush order s3 is sent instead. The buffer unit 11 also updates the history data and predicted value if needed and sends these (signals s71 and s72) to the value cache 10 for storage so that the updated data can be used in subsequent predictions.

Figure 4:
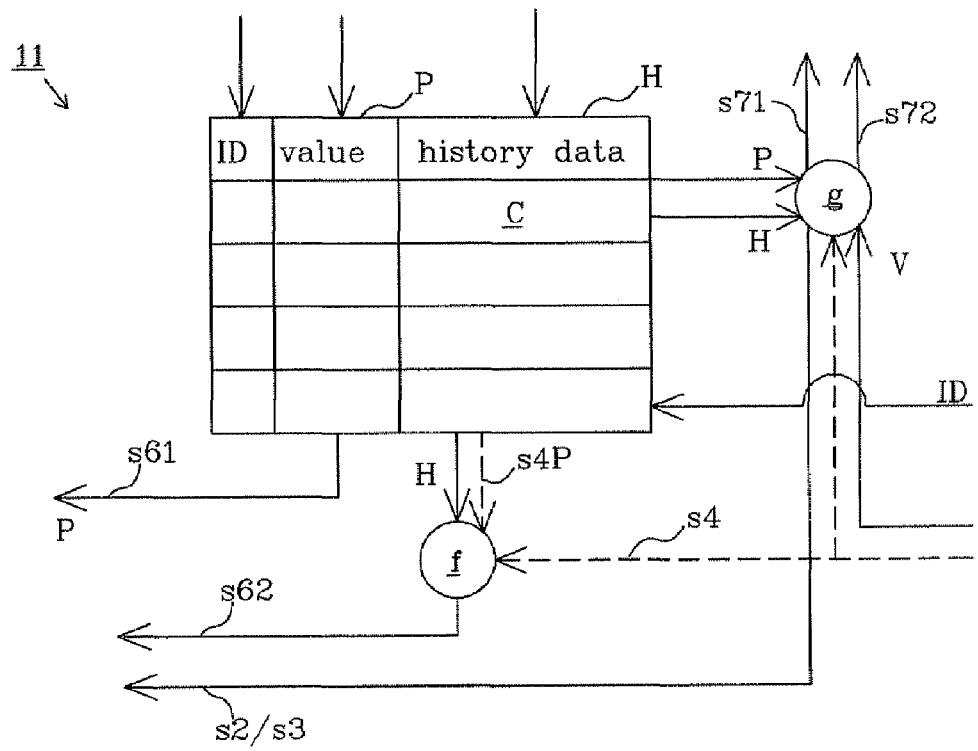
FIG. 4 is a block diagram tat shows a more detailed illustration of a buffer unit of a value prediction unit according to an example embodiment.

In this particular implementation of the VPU 9, the decision logic 12 is incorporated in the buffer unit 11. FIG. 4 shows a more detailed illustration of the buffer unit 11. The buffer unit has a table 13 in which identity codes ID, predictions P and history data H are stored for ongoing predictions. The identity code ID enables the processor to keep track of the different parts of an instruction, which during execution is scattered all over the processor 1. In the buffer unit 11 the identity code enables that the right set of true value V and prediction P is compared.

There are two decisions to be made in the decision logic 12, indicated as parts f and g of the decision logic 12 in FIG. 4. In the part f of the logic a yes/no decision is made whether to predict or not based on the history data H and the cache hit signal s4. The part f logic may base its decision on an endless variation of rules. The rule may for instance be to predict if the cache hit signal s4 indicates a cache miss and a counter C of the history data H is above a predetermined threshold. Another example of a rule is to give weight factors to the cache hit signal s4 and the history data H and base the decision on the result of a combination of the weighted information.

The cache hit signal s4 is received before the true value V is delivered from the memory system, but there is still some waiting time involved until the cache hit signal s4 is received. An alternative embodiment is to use a cache hit prediction s4P instead of the actual cache hit signal s4 in the decision described above. This will speed up the prediction decision at the cost of some uncertainty regarding the expected cache hit. If the cache hit prediction s4P is used instead of the actual cache hit signal s4, history data H is not only stored in respect of value predictions P but also in respect of cache hit predictions S4P. In FIG. 4, the cache hit signal s4 and the cache hit prediction s4P are shown as dashed input signals to the part f of the decision logic 12. This is to indicate the above mentioned alternatives of either using the actual cache hit signal s4 or the cache hit prediction s4P, which may be included in the history data H.

In the part g of the decision logic 12 the true value V is compared to the value prediction P to decide if the prediction P was correct. The outcome of this decision will, as explained above, either be the flush order s3 or the clear speculative flag order s2. The part g of the logic is also responsible for updating the value predictions P and history data H if necessary. The cache hit signal s4 can, depending on the implementation, be input to the g part and used as a factor to calculate counter values or saved separately for later use in the part f of the logic. How history data H is stored and updated is the subject of many research reports, and since it is not the core of the invention it is not discussed in any greater detail herein.

The embodiments discussed above were described in the context of an out-of-order processor 1 equipped with a reorder buffer 7. The present invention is however not dependent on any particular processor architecture but adapts itself to other architectures. The present invention is also applicable with different types of memory configurations. The present invention may for instance be used in multi-level cache systems where many different prediction schemes are possible depending on in which level a cache hit is indicated. The rule may for instance be to inhibit prediction if a cache hit occurs in the first level of the cache or to inhibit prediction if there is a cache hit in any of the levels of the cache. In some memory systems a cache miss is directly indicated by the address. This is the case in for instance static caches, i.e. SRAM address controlled fast memory, and memory mapped IO configurations. When a cache miss is directly indicated by the address there is no need to wait for a cache hit signal s4 or to predict a cache hit, but it is still possible to base the prediction decision on cache hit/miss information 14.

The present invention may further be used in virtual memory machines. A virtual memory machine is a processor wherein address calculation involves translating a virtual address into a physical address. The address calculation is generally supported by a translation look-aside buffer (TLB) 24. If the processor in FIG. 1 is assumed to be a virtual memory machine, the TLB 24 would typically reside in the Address Calculation Unit (ACU) 5 as an address translation cache. A miss in this cache would mean a load of page data 25 to get the physical address from memory before the request to fetch data can be sent to memory, i.e. the latency before the c the fetch to load the value can be sent to memory. This implies that there is a fairly long latency until the true value is received from memory and that the speculative execution may give rise to a fairly large time gain. Thus a signal 26 of a cache hit or cache miss from the TLB may be used as a factor in the decision of whether or not to execute speculatively in the same way as a cache hit or miss signal in a data cache.

The invention can be used together with confidence prediction data based on earlier predictions, as described above, or without. In a multi-level cache system the different cache level hits could be combined with different confidence threshold values to produce an optimal decision based on current prediction confidence.

In an example embodiment, the candidates for value prediction are chosen only among the values for which cache misses occur. There is then no need to store prediction statistics when cache hits are detected, thereby reducing the need for storage for value prediction history statistics.

The above-described embodiments utilize information from the memory system, which carries information about the expected gain from value prediction. Information from the execution engine could also be used to estimate the potential gain of value prediction. Embodiments that do this by means of taking the dependency depth into consideration are described hereinafter.

There are different numbers of instructions depending on each load instruction. If the dependency chain is short for a load instruction in an out-of-order processor it is likely that the load latency can be hidden by other instructions that do not depend on the value to be loaded. If on the other hand the dependency chain is long, it is an indication that too many instructions are awaiting the result of the load instruction for the load latency to be hidden. The estimated gain of value prediction is thus larger when the dependency chain is long than when it is short.

Thus an embodiment uses information regarding the dependency depth (i.e. information regarding the length of the dependency chain) to decide whether to predict a value or not. The decision is to only perform speculative execution based on the prediction P when the number of dependent instructions on the speculated load value is sufficiently large to motivate the risk of speculation. The length of the dependency chain that is suitable to qualify for value prediction depends on the size of the instruction window subjected to out-of-order execution.

The dependency depth information may either be a prediction of the dependency depth based on dependency chain history or the "current" dependency depth that relate to the load instruction to be executed. The advantage of using a prediction of the dependency depth is that it is fairly simple since the current depth may be difficult, or in many processor architectures impossible, to derive. On the other hand, a disadvantage of using a prediction is that the dependency depth may be mis-predicted which means that a certain degree of uncertainty is involved.

We will describe both an embodiment based on a prediction of the dependency depth and an embodiment based on the true dependency depth.

According to an example embodiment based on dependency depth prediction, the structure used to retain out-of-order execution data, such as the reorder buffer 7, stores a speculative identity field (SID) instead of simple speculative flag. The size of the SID must accommodate the number of simultaneously active speculations. With the help of the SID, a storage structure is indexed, which builds a value dependence chain during execution. When the speculative execution for a predicted value is finished, the depth of the value dependence chain indexed in the corresponding SID is stored to be used to influence future decisions whether to speculate or not. If other types of history data H are stored also, for use in the speculation decision, the dependency depth information may be stored together with such other history data.

Figure 5:
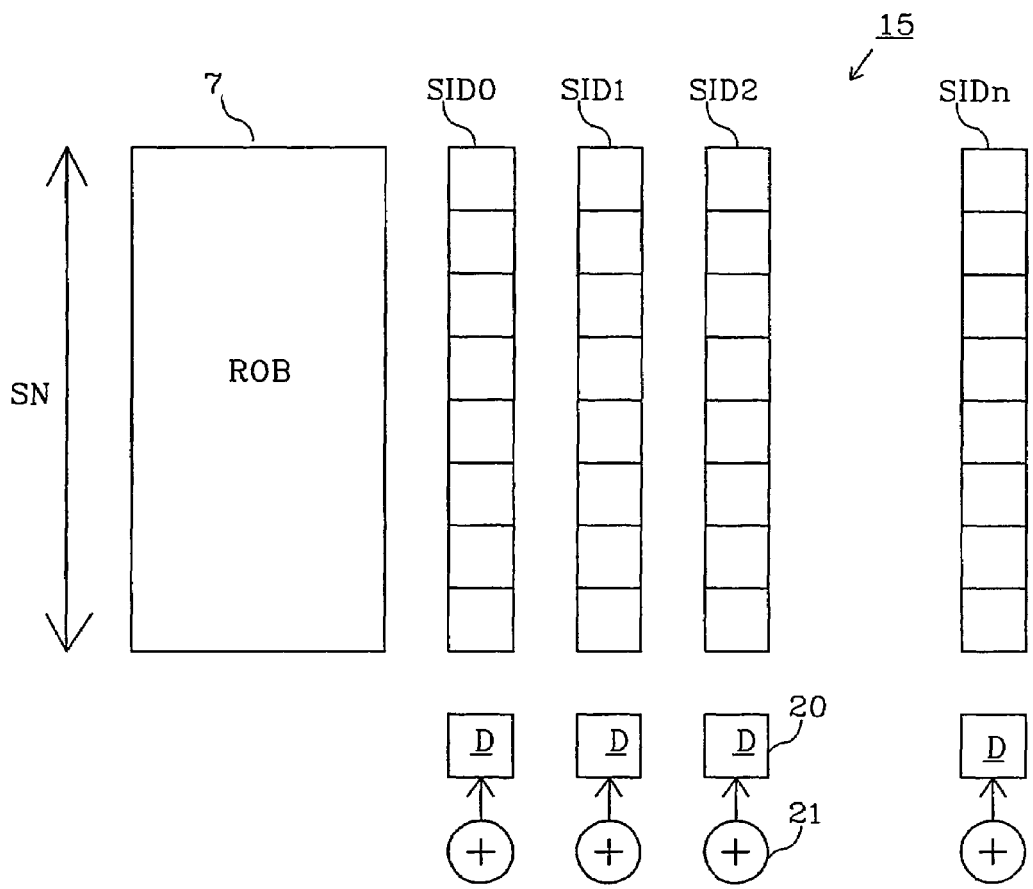
FIG. 5 is a schematic block diagram of a SID structure according to an embodiment and a reorder buffer (ROB).

FIG. 5 shows a schematic illustration of a SID structure 15 with vectors SID0, SID1, SID2, SIDn, alongside the reorder buffer (ROB) 7. The ROB 7 has an index called a sequence number SN. The sequence number is an identity code, which enables the processor to keep track of the different parts of the instruction during execution. The SID structure 15 is illustrated alongside the ROB 7 since the SID and the ROB are subject to the same stepping orders.

However, when implemented the SID 15 does not have to be placed close to the ROB 7, but can instead e.g. be placed close to the reservation stations 3.

When the prediction P is output from the VPU 9, the prediction is assigned a SID number corresponding to a SID vector. When the prediction P is stored in the reorder buffer 7, a hit is set in the assigned SID vector which correspond to the sequence number SN of the load instruction that was predicted. Thus the hit that is set is uniquely defined by the SID number and the sequence number SN. When the prediction P is used to execute a subsequent instruction the result is stored in the ROB 7 and assigned another sequence number SN. The sequence number of the load instruction is then called a source sequence number and the sequence number of the result of the subsequent instruction is called a destination sequence number. If the source sequence number has a hit set in a SID vector the hit in the SID vector that correspond to the destination sequence number is also set to indicate a speculative data dependence. When the prediction P is verified as correct or incorrect, the speculative state is to be cleared and the SID vector that correspond to the verified prediction is cleared so that it can be used for other predictions. Before clearing the SID vector the number of hits that are set in the vector are sent to the VPU 9. This number is the dependency depth D of the speculated load instruction and it is stored in the VPU 9 to form a basis for dependency depth predictions for future decisions whether to speculate or not with respect to the load instruction. The SID vectors may each be associated with a compute logic for computing the dependency depth. Each SID vector may have a depth register 20 and an adder 21, which increments the depth register 20 for each new SID vector hit assigned.

A simple example will now be described in connection with FIGS. 6*a–e* in order to further illustrate how the dependency depth of load instructions can be registered and stored to be used in future speculation decisions as mentioned above. In this simplified example we assume that we have an out-of-order processor 1 with a reorder buffer 7 of five entries and with support for two value speculations in flight simultaneously. FIGS. 6*a–e* illustrate the SID vectors SID0 and SID 1 of the processor alongside a list of sequence numbers SN0–SN4 that correspond to the five entries in the reorder buffer. A pseudo assembly code 16 for the example processor is also illustrated in the FIGS. 6*a–e*. An arrow 17 shows the point of execution in the code throughout the figures.

Figure 6A:
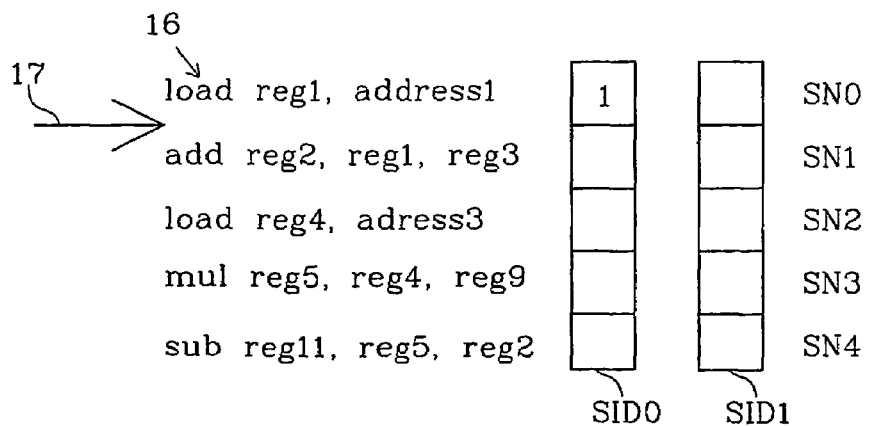

FIG. 6*a* illustrates that a load instruction has been executed speculatively and a value reg1 has been predicted. The hit that is set in the SID vector SID0 indicates the speculative execution of the load instruction.

Figure 6B:
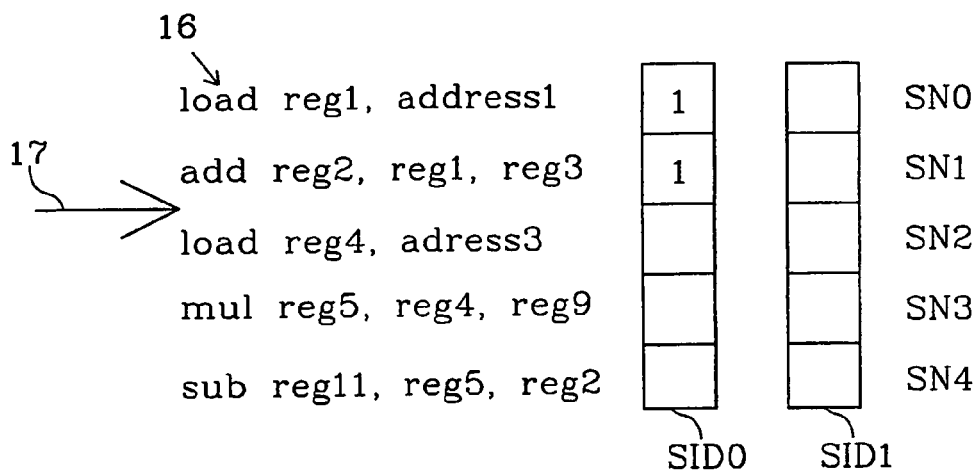

FIG. 6*b* illustrates that a subsequent add instruction has been executed, where the predicted value reg1 was used. For this purpose, the value reg1 was retrieved from the reorder buffer together with its sequence number SN0. An indication of a speculation dependency was found in vector SID0 for sequence number SN0, which means that the speculation dependency exist also for the result of the add instruction reg2 associated with sequence number SN1. Thus a hit is set in vector SID0 in the position that correspond to sequence number SN1.

Figure 6C:
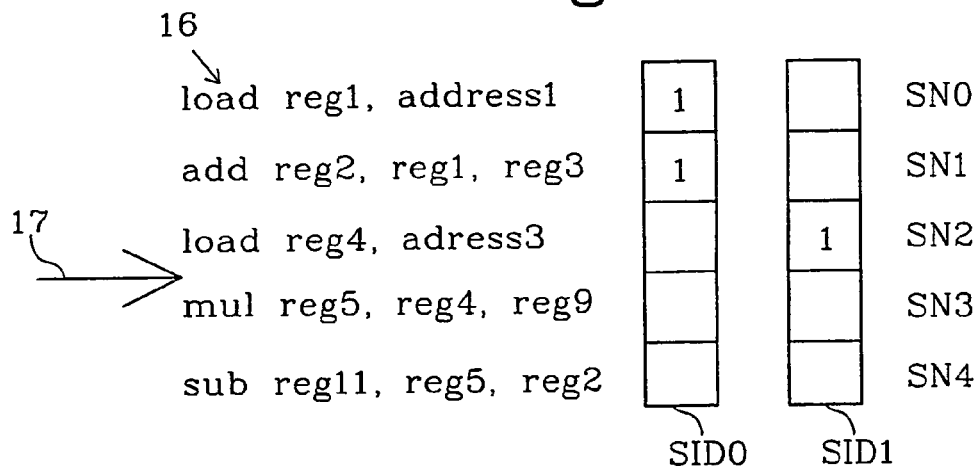

The next instruction that is executed is another load instruction for a value reg4 as shown in FIG. 6*c*. This load instruction is also subject to value prediction. The SID vector SID1 is used to keep track of the dependency of the speculative value reg4 as shown in the figure.

Figure 6D:
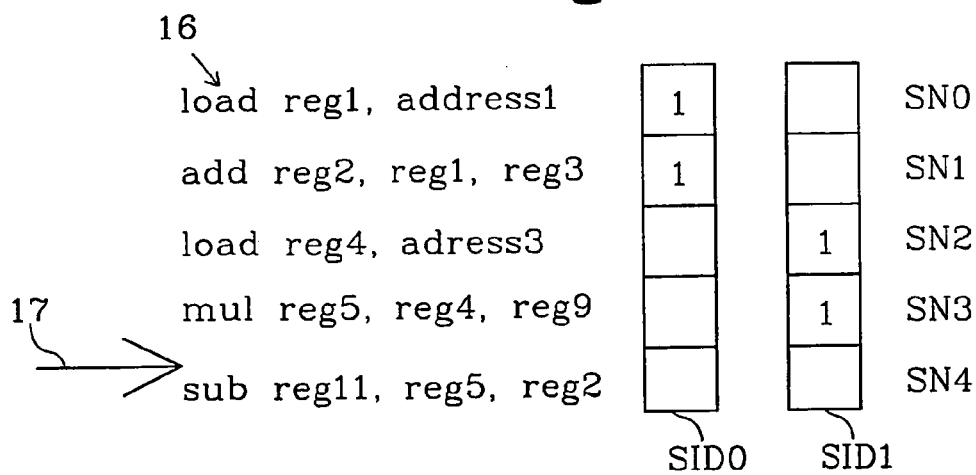

The next multiplication instruction depends on the speculative value reg4. This is detected when the speculative value reg4 is delivered from the reorder buffer together with the sequence number SN2. A hit is set for sequence number SN2 in vector SID1 and hence a hit is set in SID1 for sequence number SN3 also as illustrated in FIG. 6d. The result reg5 of the multiplication instruction is stored in the reorder buffer and associated with sequence number SN3.

The last instruction that is illustrated in this example is a subtract instruction. FIG. 6e shows the status of the SID vectors after this instruction has been executed. The subtract instructions depends on two values, reg5 and reg2, which depend on both of the earlier predictions. When the value bound with reg5 is delivered from the ROB to a reservation station along with sequence number SN3, the speculative hit set for SN3 in the vector SID1 is detected and the SN4 entry in the vector SID1 is set. The same applies for the value reg2 associated with sequence number SN1. The speculative hit for SN1 that is set in vector SID0 is detected in the reservation station and the hit in SID0 that correspond to sequence number SN4 is set.

When the true value for the reg1 load instruction is received from the memory system, the VPU can order the vector SID0 to be cleared if the prediction turns out to be correct. According to this example each vector SID0 and SID1 is associated with a depth register that is incremented during the speculative execution. The dependency register associated with the vector SID0 will when the true value for reg1 is delivered contain a number, which is considered as the dependency depth for this prediction. The dependency depth is delivered into the value cache 10 when the vector SID0 is cleared. The dependency depth is stored and used to produce the dependency depth prediction, which is used later as a factor in the future decisions whether to speculate or not.

In the case of a correct prediction for a load instruction the result of the load instruction can be discarded from the reorder buffer and written to the register file. The instructions that are marked as speculation dependent will be cleared as speculative as the associated SID vector is released (i.e. cleared of hits). The released SID vector is free to be used for subsequent value speculations.

If the prediction was incorrect the reorder buffer and the associated SID vector/s are flushed. The dependency depth for a mis-speculated value could be reported to the value cache 10, but it could be misleading if there where value dependent control flow instructions (branches) in the execution path.

The embodiments of the present invention that use dependency depth prediction as a factor in the speculation decision are not dependent on any particular processor architecture, but adapt well to many different types of processors.

An embodimentt that uses current information on the dependency depth of the load instruction to be executed will be explained now. Compared to the dependency prediction schemes based on dependency chain history, the scheme based on the current dependency depth is forced to extract its information earlier in the execution pipe in order to decide whether or not to use value speculation at the time of instruction issue. It is not possible to derive the current dependency depth in all types of processors. However, it is possible in a processor with a decoupled instruction fetch unit, for instance a trace processor, which will open the microarchitecture to dependency depth calculation beforehand. If traces are decoded beforehand the dependency depth of each load instruction execution could be calculated. As the trace construction is done off the critical path the calculation of a dependency depth of a load instruction execution can be done as a trace pre-processing step if dependency depth extraction logic is added to the trace processor. A trace processor in which this scheme may be implemented is illustrated in "Processor Architectures", Ch. 5.2, page 228, J. Silc, B. Robic, T. Ungerer, Springer Verlag, ISBN 3-540-64798-8. This trace processor includes a fill unit, which is where the trace is constructed. Augmenting this unit with dependency depth extraction logic will enable each delivered load instruction to carry with it the number of instructions dependent on the load value (in the trace). Thereby, when a trace and its load instructions are delivered to the issue step, each load instruction's dependency depth is also delivered. The actual dependency depth of a load instruction is thus delivered together with the load instruction to the issue step if the trace is executed as constructed.

The embodiments described above illustrated that more qualified speculation decisions in respect of value prediction can be obtained by means of taking the estimated gain of correct prediction into consideration. An estimation of the gain of correct prediction is cache hit/miss information while another estimation is the dependency depth. Many different schemes tat use the estimated gain of prediction as a factor in the speculation decision are possible and several examples have been mentioned above. Another example scheme takes both of the two types of estimations mentioned above, cache hit/miss information and dependency depth, into consideration when the decision whether to speculate or not is made.

The different embodiments focus on different indicators; number of instructions dependent on a load instruction, and cache hit or cache miss. The above-mentioned prior art methods for selective value speculation based on instruction dependency predictions catch dynamic behavior past and are rater complex. However, these prior art methods suffer from the interaction of cache fetch actions. A long dynamic dependency chain might not be long the next time around. The contents of a cache might be different from time to time.

The embodiments are rater simple, but may still be very reliable. Many additional advantages may be derived from combinations of the "basic" embodiments. If for instance the cache hit scheme is combined wit the dependency depth prediction scheme, it will only be decided to base execution on a value prediction when the load latency is long and the instruction window contains a large number of instructions dependent on the value to be loaded. The combination will add dynamics to the dependency depth prediction scheme and static use-information to the cache hit scheme. It will also use actual memory latency information, not just predicted.

Thus the "basic" embodiments may be sorted into different classes. One way of classifying the embodiments is according to which part of the processor the information used in the speculation decision originates from. There are schemes that use information from the memory system and schemes that use information from the execution engine. Information relating to cache hit or miss signals is information originating from the memory system and information regarding dependency depth is information from the execution engine. Another way of classifying the schemes is according to the point in time when the information to be used is collected. The embodiments above that use predictions based on historical data use information from the past while an unpredicted cache hit or miss signal or a current dependency depth is from the present. Each class of schemes has its strengths and weaknesses. By creating schemes that are combinations of different classes the strength associated with one class may be used to counter-act the weaknesses of other classes.

The major advantage of the present technology is that value prediction in situations where it might seem unwise due to the risk involved can be avoided. The present technology makes is possible to make and informed speculation decision by means of basing the decision not only on the success rate of previous predictions, but also on the estimated gain from a correct prediction. Avoiding value prediction when the estimated gain of correct prediction is small compared to the risk involved improves the performance of the processor.

The invention claimed is:

1. A processing unit for executing instructions in a computer system, which processing unit includes a value prediction unit for producing value predictions of values associated with instructions, which value prediction unit includes decision logic for deciding whether or not a value prediction for a first value is to be output for use in an execution unit, wherein the decision logic is arranged to base its decision on information associated with the estimated time gain of execution based on a correct value prediction, wherein the information on which the decision is based includes data cache hit/miss information that provides an indication of the likelihood that the first value and/or the address of the first value is located in a data cache;

wherein the information of which the decision is based further includes a dependency depth prediction, which is a prediction of the number of instructions that depend on the first value during speculative execution based on a prediction of the first value; and wherein the processing unit further includes a data structure for storing information indicative of the dependency depth during execution based on the value prediction of the first value and means for storing the dependency depth in the value prediction unit for use as a dependency depth prediction for subsequent value predictions of the first value.

2. The processing unit according to claim 1, wherein the data cache hit/miss information relates to at least one actual data cache hit signal, such that the data cache hit/miss information with certainty indicates whether or not the first value and/or the address of the first value is located in a data cache.

3. The processing unit according to claim 2, wherein the decision logic is prevented from outputting the value prediction for use in the execution unit when the data cache hit/miss information indicates that the first value is located in a data cache.

4. The processing unit according to claim 2, wherein the decision logic is prevented from outputting the value prediction for use in the execution unit when the data cache hit/miss information indicates that the first value and the address of the first value each are located in a data cache.

5. The processing unit according to claim 1, wherein the information on which the decision is based includes a data cache hit prediction, which is a prediction of whether or not the first value is located in a data cache.

6. The processing unit according to claim 5, wherein the decision logic is prevented from outputting the value prediction for use in the execution unit when the data cache hit prediction predicts that the first value is located in the data cache.

7. The processing unit according to claim 1, the information on which the decision is based further includes dependency depth information, which is information on the number of instructions that depend on the first value during speculative execution based on a prediction of the first value.

8. The processing unit according to claim 7, wherein the decision logic is prevented from outputting the value prediction for use in the execution unit when the dependency depth information is within a predetermined range.

9. The processing unit according to claim 1, wherein the decision logic is prevented from outputting the value prediction for use in the execution unit when the dependency depth prediction is within a predetermined range.

10. The processing unit according to claim 1, wherein the information on which the decision is based further includes information on the success rate of previous value predictions of the first value.

11. The processing unit according to claim 10, wherein the information on the success rate of previous value predictions of the first value includes a counter value and in that the decision logic is prevented from outputting the value prediction for use in the execution unit when the counter value is within a predetermined range.

12. The processing unit according to claim 1, wherein the decision logic is arranged to assign different weight factors to different parts of the information on which the decision is based and to combine the weighted parts of the information to form a decision value; and in that the decision logic is prevented from outputting the value prediction for use in the execution unit when the decision value is within a predetermined range.

13. A method in a processing unit for executing instructions in a computer system, which method includes the step of producing a value prediction for a first value associated with a first instruction and the step of deciding whether or not to output the value prediction for use in an execution unit, which decision is based on information associated with the estimated time gain of execution based on a correct value prediction, wherein the information on which the decision is based includes data cache hit/miss information that provides an indication of the likelihood that the first value and/or the address of the first value is located in a data cache;

wherein the information on which the decision is based further includes a dependency depth prediction, which is a prediction of the number of instructions that depend of the first value during speculative execution based on a prediction of the first value; and wherein the method further includes a step of storing information indicative of the dependency depth in a data structure during execution based of the value prediction of the first value and a step of storing the dependency depth in a value prediction unit for use as a dependency depth prediction for subsequent value predictions of the first value.

14. The method according to claim 13, wherein the data cache hit/miss information relates to at least one actual data cache hit signal, such that the data cache hit/miss information with certainty indicates whether or not the first value and/or the address of the first value is located in a data cache.

15. The method according to claim 14, further comprising deciding not to output the value prediction for use in the execution unit when the data cache hit/miss information indicates that the first value is located in a data cache.

16. The method according to claim 14, further comprising deciding not to output the value prediction for use in the execution unit when the data cache hit/miss information indicates that the first value and the address of the first value each are located in a data cache.

17. The method according to claim 13, wherein the information on which the decision is based includes a data cache hit prediction (s4P), which is a prediction of whether or not the first value is located in a data cache.

18. The method according to claim 17, further comprising deciding not to output the value prediction for use in the execution unit when the data cache hit prediction (s4P) predicts that the first value is located in the data cache.

19. The method according to claim 13, wherein the information on which the decision is based further includes dependency depth information, which is information on the number of instructions that depend on the first value during speculative execution based on a prediction of the first value.

20. The method according to claim 19, further comprising deciding not to output the value prediction for use in the execution unit when the dependency depth information is within a predetermined range.

21. The method according to claim 13, further comprising deciding not to output the value prediction for use in the execution unit when the dependency depth prediction is within a predetermined range.

22. The method according to claim 13, wherein the information on which the decision is based further includes information on the success rate of previous value predictions of the first value.

23. The method according to claim 22, further comprising the information on the success rate of previous value predictions of the first value including a counter value and by deciding not to output the value prediction to the execution unit when the counter value is within a predetermined range.

24. The method according to claim 13, further comprising assigning different weight factors to different parts of the information on which the decision is based and combining the weighted parts of the information to form a decision value; and by deciding not to output the value prediction to the execution unit when the decision value is within a predetermined range.

* * * * *